G. H. SMITH.
BEET TOPPING MACHINE.
APPLICATION FILED AUG. 20, 1917.
1,301,329.
Patented Apr. 22, 1919.
2 SHEETS—SHEET 1.
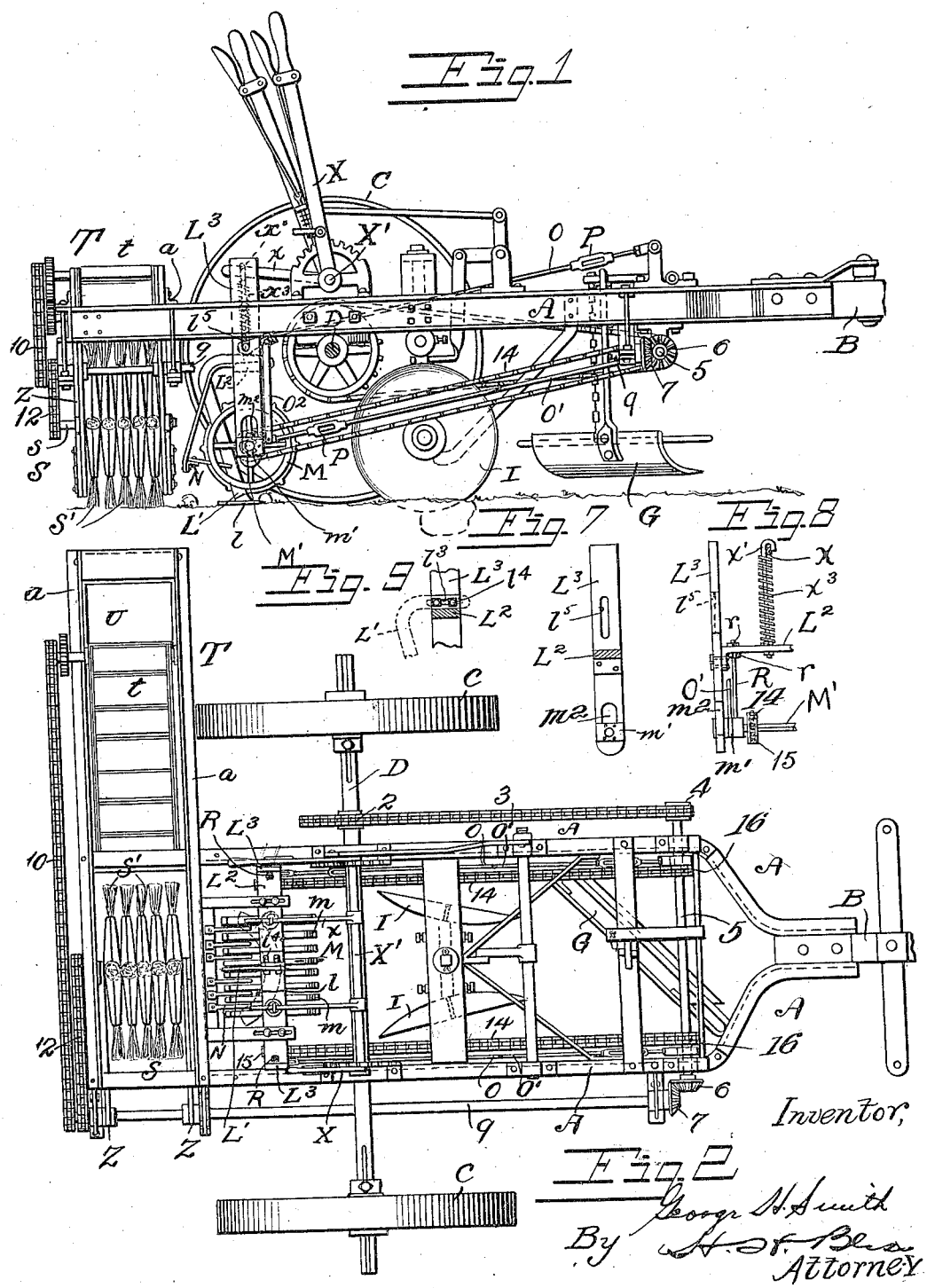

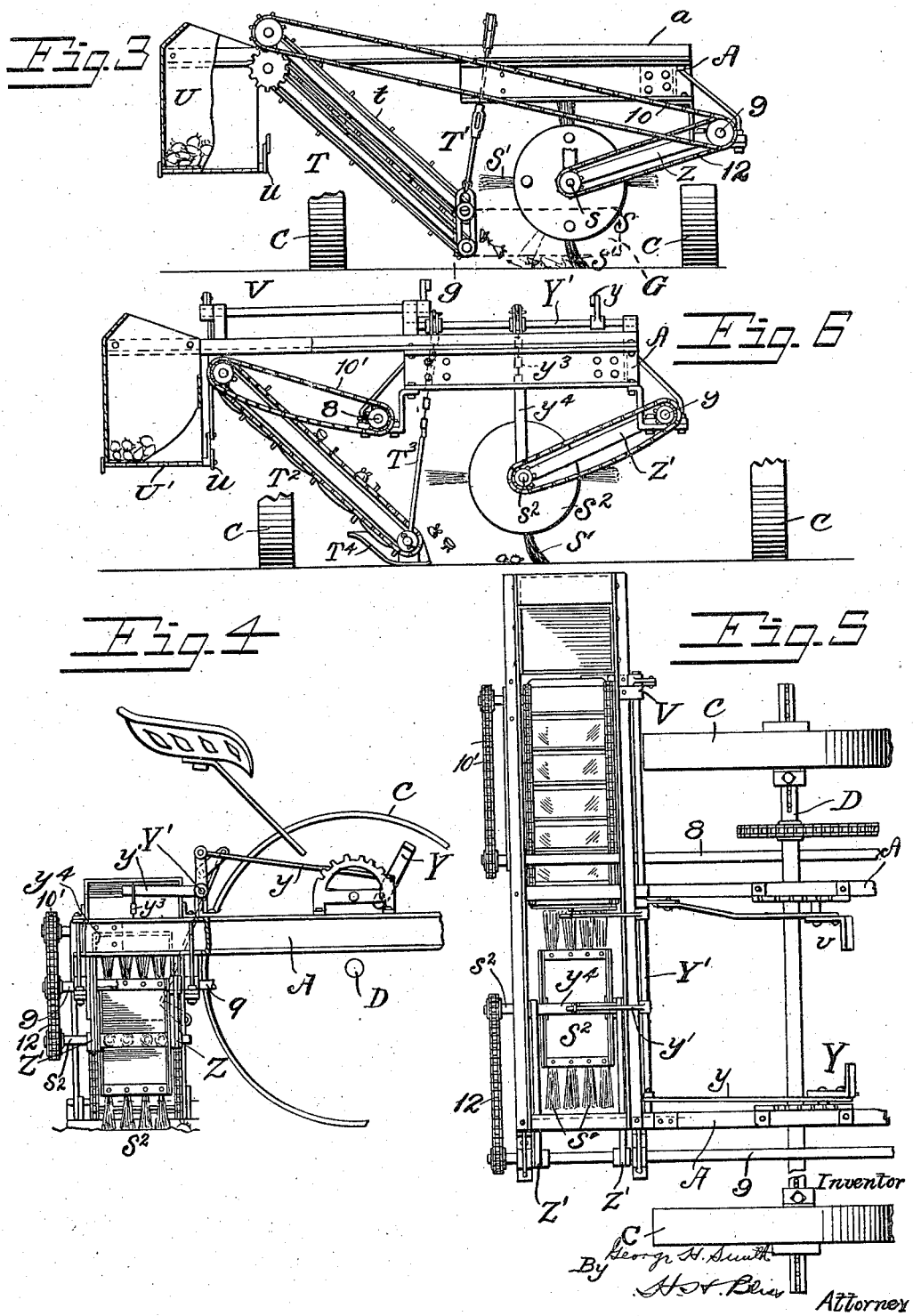

UNITED STATES PATENT OFFICE.

GEORGE H. SMITH, OF COLUMBUS, OHIO.

BEET-TOPPING MACHINE.

1,301,329.
Specification of Letters Patent.
Patented Apr. 22, 1919.

Application filed August 20, 1917. Serial No. 187,176.

*To all whom it may concern:*

Be it known that I, GEORGE H. SMITH, a citizen of the United States, residing at Columbus, in the county of Franklin and State of Ohio, have invented certain new and useful Improvements in Beet-Topping Machines, of which the following is a specification, reference being had therein to the accompanying drawing.

This invention relates to machines for topping beets and collecting the materials severed by the cutters.

In the accompanying drawings:—

Figure 1 is a side elevation of a machine embodying my improvements.

Fig. 2 is a top plan of the machine, some of the parts being removed.

Fig. 3 is a rear elevation, some of the parts shown in other figures being omitted.

Figs. 4, 5, and 6 are views of modified mechanisms for removing the severed crowns from the ground.

Figs. 7, 8 and 9 show details.

The main frame comprises sills A, A curved in at the front end to tongue B, and suitable cross bars.

C, C are ground wheels connected to axle D by backing ratchets.

G is a front diagonal cutter to sever the larger upright leaves.

I, I are vertically disposed concavo-convex rotating sharp edged disks to sever the lateral leaves and form furrows to provide clearance for the topping cutter $l$ immediately in the rear. Cutter $l$ has a central standard L' and extends laterally in such plane as to sever the crowns. M is a gage drum having shaft M' and a series of disks or wheels $m$.

A frame with uprights $L^3$ and cross bar $L^2$ carries the drum and cutter. The frame can rise and fall bodily, and its lower end or its upper end can swing, for adjustment, backward or forward. The cutter standard is longitudinally adjustable on bar $L^2$ and fastened by bolts $l^4$ in slot $l^3$. The drum M is supported, with vertical adjustment, by threaded rods R connected to the drum bearings $m'$ and fastened to bar $L^2$ by nuts $r$.

The frame $L^2$, $L^3$ is suspended by links $x'$ from arms $x$ carried by cross shaft X' having a segment lock and a lever X for manual adjustment. Springs $x^3$ between arms $x$ and bar $L^2$ press the frame down to the limit fixed by hooks or lugs on the links, and loosely engage the arms $x$; but the links and frame can move upward against the spring.

The frame $L^2$, $L^3$ is held by two pairs of parallel bars, one pair on each side of the machine, and each comprising bars O, O'; each bar O being vertically adjustably pivoted in slots $l^5$ to the upper part of an upright $L^3$, and each bar O' being connected to a drum bearing. The bars O, O' of each pair are joined by and pivotally connected to a bar $O^2$. The upper part or lower part of frame $L^3$, $L^2$ can be adjusted forward or backward by buckles P.

N indicates a mechanism for cleaning the drum and keeping the spaces between the disks open. The drum has wheels 15 driven by chains 14 which receive power from axle D through sprocket wheel 2, chain 3, wheel 4, shaft 5 and wheels 16. The drum bearings $m'$ slide in slots in bars $L^3$.

When the machine is in operation the parts above referred to act to sever from the plants the upwardly projecting and the laterally projecting leaves and move them laterally away from the standing beets; and then to sever the crown parts of the beets, the crowns remaining, after the cutting, close to their original positions.

Instead of leaving the crowns to go to waste on the ground and before disturbing the surface soil by the beet-pulling devices (which follow the present machine) I gather the crowns in measured masses and deposit them at predetermined points remote from the severed leaves and in the spaces which are, respectively, between one beet row and the next row. Immediately after the crowns are severed I cause them to be acted on by means which throw them directly laterally and lift them to points sufficiently far above the ground surface to have them taken up by an inclined, transversely arranged elevator which, in turn, delivers them to a receptacle, supported on the machine and capable of carrying a comparatively large mass.

The device for accomplishing the work of throwing the crowns laterally and lifting them, relatively, comprises a series of rows of brush tufts revolving in transverse planes at right angles to the path of the machine. The action of these throwing and lifting tufts is not that of an ordinary rotary brush, particularly not that of a brush whose active surface is practically a continuous cylindrical surface of brush filament terminals.

This throwing or lifting device is indicated as an entirety by S and has a central shaft s. The shaft is mounted in the lower end of radius bars Z, Z supported on the longitudinal shaft 9. As shown in Figs. 1, 2 and 3, the shaft s has a series of holders for brush tufts, these holders in this case each being a pair of disks which are clamped together and have four brush tufts S' widely spaced apart and firmly clamped between the edge parts of the disks. The tuft carrying elements of the series (that is, the disk pairs of the row) are, as aforesaid, secured to the shaft s. The axis of this shaft is in the central longitudinal vertical plane of the machine, and, consequently, the tufts act to pick up the crowns, at points immediately behind the cutter $l$, and to throw them practically at right angles to the path of advance.

The shaft s is rotated by power from the axle D, the cross shaft 5 being connected to shaft 9 at the side of the machine by the beveled gears 6 and 7, and shaft 9 being connected to shaft s by a chain 12 engaging sprockets on the shafts. The tufts as they descend come in contact with the earth some inches to the right of the beet row and of the row of severed crowns. As they approach perpendicular lines their filaments are flexed or bent. The gearing and power transmission devices turn the shaft s, and the tufts S' with a comparatively high speed. Immediately after the tufts pass the vertical plane of the shaft axis they straighten, elastically, to radial positions again, and in doing so flirt or throw the crowns with considerable force outward and upward. The brush and its vertically vibrating support are so arranged that the final straightening out, elastically, of the brush filaments, occurs after their extremities have traveled a short distance beyond the vertical plane of the beet row, this insuring that the crowns which lie on the left side of the plants, and those which lie on the lines of the row, will be also caught and thrown laterally. The tufts of one row have ample time, before those of the next row reach the earth, to firmly engage with the crowns in their paths of rotation, and, as stated, throw or flirt them in the way described. The tufts of the preceding row, however, travel upward far enough to leave a clear space extending inward from the cylindrical surface generated by the rotation of the tufts to provide, for the crowns, a free path.

This is in contradistinction from the relatively slowly rotating brush structures each of which has a mass of closely arranged filaments extending in all radial directions around the axis so that the filament terminals provide a substantially unbroken cylindrical surface. These brush structures, even when relatively highly speeded, act merely to push the crowns along the surface of the earth, without any throwing or lifting action.

The shear cutter G is so arranged, as will be seen, that it severs the upstanding leaves of the beets and carries them to a line at the left (see the point indicated by $g$, Fig. 3) at a distance, laterally, from the beet row, leaving the soil surface at the sides of the beet row comparatively clear of leaves, as shown in dotted lines in Fig. 3; and the brush filaments have an approximately smooth ground surface on which they will engage with the crowns only.

When properly arranged, the action of the peculiarly constructed throwing or lifting devices which I describe is such that the crowns can be caught upon the inclined conveyer even though its lower ends may be several inches above the earth's surface.

A conveyer is indicated at T. The crowns are received upon it at its lower end and are carried transversely and upward to longitudinal planes which are considerably outside of the nearest ground wheel C. They are deposited in a receptacle U of predetermined capacity. When the load in the receptacle has become sufficiently large it is dropped therefrom by the operator. The framework which supports the elevator and the receptacle is provided by bars $a$ which are secured to the main frame bars A and are extended laterally therefrom. The inner and lower end of the elevator frame is suspended by chains or links T' from the main frame, and adjusted as desired.

The elevator T is generally arranged at a steep inclination; and in order to prevent the escape of the crowns from its upper surface I employ an upper or retaining conveyer $t$. The power to actuate the conveyers is transmitted from a suitable shaft (as from shaft 9) by means of a chain 10. In Figs. 1, 2 and 3 this is shown as driving the upper carrier, the latter being geared to the one below it.

Any suitable means can be employed for attaching the devices which support the inner lower end of the elevator, and for actuating the devices which drop the load from the receptacle. Thus, in Figs. 4, 5 and 6 the upper part of the chain or link system, such as that at T' in Fig. 3, and at $T^3$, Fig. 6, is connected to a shaft Y'.

This shaft can also be utilized for adjusting the position of the crown throwing devices S for which purpose the shaft can be provided with an arm $y'$ from which there extends downward a chain or links $y^3$ and yoke $y^4$ engaging with the end parts of the shaft s. The shaft Y' is shown in Figs. 4, 5 and 6 as being actuated by a foot crank Y and link $y$. These Figs. 4, 5 and 6 further illustrate one of the standard devices that can be used for dropping the load from the receptacle U. In such a case the bottom U' is hinged at *u*. V indicates a controlling mechanism extending to the point where it can be conveniently actuated by the foot lever *v*.

The brush and its vertically swinging frame, on the one hand, and the elevator and its supporting frame, on the other hand, are separated from each other and are independently supported, the lower end of the elevator being spaced some distance away from the beet row, leaving a space of ground surface exposed. No part of the mechanism lies over this space along the ground inside the lower end of the elevator, and hence none of the severed crowns which drop close to the beets on the elevator side of the row will be covered, but all will be exposed to the action of the brush.

In the mechanism shown in Figs. 4, 5 and 6, the deflector $S^2$ and its shaft $s^2$ are supported from the shaft 9 by radius bars $Z'$ all similar to the corresponding parts in the other construction; the elevator $T^2$ is similar to that at T, but is here shown without the upper elevator *t*; the supporting device $T^3$ for the lower end of the elevator is substantially similar to that at T'; the elevator in this case in Figs. 4, 5 and 6 being provided with a shoe $T^4$ at the lower end to assist in sliding over the ground and in receiving the beet crowns; the conveyer drive shaft is actuated by a chain 10' similar to that at 10 but it is driven from a supplemental shaft 8, actuated in any suitable way.

I am aware that use has been made, with beet topping machines, of rotating shafts provided with metallic prongs for the moving of the severed crowns away from the beet rows. These prongs must be so arranged that they will not extend downward far enough to contact with the earth's surface, for if they should project downward sufficiently far for that there would be danger of their cutting or marring the upper ends of the beets. In my case the parts are so arranged that the deflector will normally tend to rest yieldingly upon the earth's surface and the elastic filaments of the tufts flex or bend under the pressure resulting from the gravity of the structure, its movements bodily vertically being independent of the main frame. These filaments while the deflector thus floats along under the action of gravity can safely contact with the upper ends of the beets and will sweep the crowns over or around them without cutting or marring, even though the upper ends of the beets are some distance above the surface.

What I claim is:—

1. In a machine for topping beets while standing in rows, the combination of the main frame, the power transmitting ground wheels supporting the frame, devices for severing the leaves at points above the crowns, supplemental devices for severing the crowns from the beets, a longitudinally arranged horizontal rotary shaft positioned in rear of the crown severing devices and approximately in the central longitudinal plane of the machine, arms pivoted to the side of the machine and swinging vertically in transverse planes and supporting the said shaft at their inner ends, a series of rows of peripherally spaced brush tufts carried by said shaft, each tuft formed of flexible elastic filaments, and power devices actuated by the ground wheels and adapted to uniformly rotate the said shaft and brush filaments in all the positions, vertically, of the brush, said parts being arranged as set forth to cause said tufts to impinge on the surface of the ground, and to flex, under the action of gravity, on lines close to the beet rows, and after passing the beets to straighten, elastically, and throw the crowns laterally.

2. In a machine for topping beets, the combination of a main frame, the power transmitting wheels supporting said frame, means for severing the leaves, supplemental means for severing the crowns from the standing beets, carrier devices freely vibratable vertically on an axis parallel to the longitudinal lines of the machine, a positively driven constantly rotating device for flirting the severed crowns laterally and throwing them upward, said device comprising a power driven shaft mounted on said carrier in the central vertical longitudinal plane of the machine and freely vibratable vertically and a series of relatively elongated rows of brush tufts parallel to said shaft and secured thereto, each tuft being composed of elastic filaments and each row being widely spaced peripherally from the adjacent rows, said vibrating carrier being adapted to permit the said shaft and rows of tufts to rise and fall in horizontal parallelism and permit the filaments of the tufts to be pressed by gravity upon, and be flexed by, the surface of the earth at points adjacent to the standing beets, as said filaments approach the row, and to elastically resume their radial positions after they have passed the row.

3. In a machine for topping standing beets, the combination of a main frame, power transmitting ground wheels supporting said frame, means for severing the crowns, a rotary shaft on a horizontal axis adapted to swing freely bodily in horizontal parallelism and positioned approximately in the vertical plane of the plant row and having at its periphery a series of radially projecting elongated rows of elastic brush tufts, each of said rows being parallel with the axis of rotation of the shaft and widely spaced peripherally from the adjacent rows, power transmitting devices connecting the ground wheels with the shaft and speeded substantially as set forth to cause the filaments while rotating with the vertically swinging shaft to rapidly contact lightly with the ground surface adjacent to the plant row and to relatively rapidly engage with the severed crowns while lying on the ground and pick them up therefrom and throw them laterally, an inclined endless carrier for carrying the crowns upward and laterally, and devices, supplemental to said endless carrier to assist it in receiving and holding the crowns delivered to it by said filaments.

4. In a machine for severing beet crowns and stacking them, the combination of the frame, the power transmitting wheels supporting the frame, means for severing the crowns of the standing beets, a rotating shaft on an axis parallel to the plant row and supported to freely swing vertically in horizontal parallelism, a series of widely peripherally spaced elongated rows of brush tufts carried by said shaft, supporting devices for said shaft arranged to freely rise and fall independently of the main frame and permit the brush tuft filaments of each row from end to end of the shaft to uniformly flex or bend backward on the ground surface under the action of gravity, power transmitting devices connecting the ground wheels with the said shaft and speeded substantially as set forth to cause the filaments of the brush tufts to rapidly contact lightly with the ground surface at points adjacent to the beet row and to relatively rapidly engage with the severed crowns and throw them laterally and upward while the filaments of the brush tufts are resuming their radial positions.

5. The combination of the main frame, the topping cutter, the elongated rotary deflector on a longitudinal horizontal axis positioned approximately in the vertical plane of the beet row, freely vibratable carrying devices for the deflector extending outward and upward from the said axis in transverse vertical planes, a second supplemental frame extending upward and outward in the opposite direction and vibratable vertically in the aforesaid transverse planes, the elevator supported on said second vibratable frame and having its inner end positioned at a distance from the deflector to leave an exposed ground surface between them and arranged to receive crowns thrown laterally by the deflector, and the receptacle at the upper outer end of the said elevator, said deflector-carrying devices and said elevator frame being independently supported from the main frame.

In testimony whereof, I affix my signature, in presence of two witnesses.

GEORGE H. SMITH.

Witnesses:
  Geo. E. McConley,
  George E. McConley, Jr.

Copies of this patent may be obtained for five cents each, by addressing the "Commissioner of Patents, Washington, D. C."